United States Patent
Koo et al.

(10) Patent No.: US 8,136,159 B2
(45) Date of Patent: Mar. 13, 2012

(54) METHOD AND SYSTEM FOR DETECTING SUSPICIOUS FRAME IN WIRELESS SENSOR NETWORK

(75) Inventors: Bon Hyun Koo, Suwon-si (KR); Wook Choi, Hwaseong-si (KR); Hyo Hyun Choi, Seoul (KR); Tae Shik Shon, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 518 days.

(21) Appl. No.: 12/275,300

(22) Filed: Nov. 21, 2008

(65) Prior Publication Data
US 2009/0133122 A1    May 21, 2009

(30) Foreign Application Priority Data
Nov. 21, 2007    (KR) .......................... 10-2007-0119247

(51) Int. Cl.
G06F 11/00    (2006.01)
G06F 12/14    (2006.01)
G06F 12/16    (2006.01)

(52) U.S. Cl. ......................................................... 726/23
(58) Field of Classification Search ........................ 726/6
See application file for complete search history.

(56) References Cited

U.S. PATENT DOCUMENTS
7,512,074 B2 *    3/2009    Strutt et al. .................... 370/238

OTHER PUBLICATIONS

Yue Chen, Barry Boehm, Luke Sheppard; Value Driven Security Threat Modeling Based on Attach Path Analysis; IEEE; 40th HICSS 207; p. 280a.*
Mike Just, Evangelous Kranakis, Tao Wan; Resisting Malicious Packet Dropping in Wireless Ad hoc Networks; Ad-Hoc, Mobile, and Wireless Netowrks Lecture Notes in CS 2003; vol. 2865; pp. 151-163.*

* cited by examiner

*Primary Examiner* — Carl Colin
*Assistant Examiner* — Dao Ho
(74) *Attorney, Agent, or Firm* — Cha & Reiter, LLC

(57) ABSTRACT

A method and system for detecting a suspicious frame in a wireless sensor network that includes: a plurality of sensor nodes, for sending sensed data and data regarding an upper-level node and cluster head node. A data collecting node receives data from the sensor nodes, sends information, and extracts data received from the sensor nodes. A first probability of occurrence of the routing path is computed with respect to training frames, and a second probability of occurrence of a source routing path is computed using the first probability. The second probability is compared with a reference value, and displays an indication notifying an abnormality of the source node according to when the second probability and the reference value.

19 Claims, 10 Drawing Sheets

(PRIOR ART)

FIG. 6

| Frame Control | Seq Num | Destination Address | Source Address | IEEE Destination Address | IEEE Source Address | ... | Parent Address | Grand Parent Address | ... |
|---|---|---|---|---|---|---|---|---|---|
| 0X00 | 1 | A | B | A | C | ... | B | A | ... |

610 — IEEE Source Address
620 — Parent Address
630 — Grand Parent Address

| 1 | ABD |
| 2 | ABE |
| 3 | ACF |
| 4 | ACG |
| 5 | ABG |
| 6 | ABF |
| 7 | ABD |
| 8 | ABD | ured using an MAC key ($K_{mac}$) to
METHOD AND SYSTEM FOR DETECTING SUSPICIOUS FRAME IN WIRELESS SENSOR NETWORK

CLAIM OF PRIORITY

This application claims priority to an application entitled "METHOD AND SYSTEM FOR DETECTING SUSPICIOUS FRAME IN WIRELESS SENSOR NETWORK," filed in the Korean Intellectual Property Office on Nov. 21, 2007 and assigned Serial No. 2007-0119247, the contents of which are incorporated herein by reference in its entirety.

BACKGROUND OF THE INVENTION

1. Field of the Invention

The present invention relates generally to a wireless sensor network. More particularly, the present invention relates to a method and system for detecting a suspicious frame in a wireless sensor network.

2. Description of the Related Art

A wireless sensor network typically includes sensor nodes and a sink node. Each sensor node comprises a miniaturized radio transceiver that can collect data through a sensor, process the collected data through a processor, and send the processed information. The sink node collects information from the sensor nodes and transfers the same to the outside. In a conventional wireless sensor network, numerous sensors located in a particular region senses a preset target and sends the sensed data to a particular node. Connected sensor nodes of a sensor network send and receive collected information regarding temperature, illumination, humidity, upper-level node and cluster head using radio frequencies.

A wireless sensor network may have a star topology or point-to-point topology, as defined in the IEEE 802.15.4 standard, which can contribute to efficient management of energy consumption at the network layer. The star topology and point-to-point topology may have different applications. For example, when sensor nodes are peripheral devices of a personal computer, they are typically designed to have a star topology. For a security service in a vast area, sensor nodes are designed to have a point-to-point topology with clusters.

Many nodes in the star or point-to-point topology establish routing paths to send and receive data. Ad-hoc On-Demand Distance Vector (AODV) is a protocol that is used by nodes to establish a routing path for data transmission.

FIGS. 1A to 1C illustrates a conventional routing process using the AODV protocol.

In a cluster of nodes 100 to 112 in FIG. 1A, the node 100 is assumed to be the cluster head. As shown in FIG. 1B, each node calculates a distance vector (DV) in consideration of links. Calculation of a DV can be performed using a known DV algorithm, and thus a detailed description thereof is omitted. In the case when the node 107 tries to send information to the cluster head (node 100), the node 107 may select one of the paths passing through the node 108, or node 103, and node 104. The distances from the node 107 to the node 108, node 103, and node 104 are 13, 7, and 6, respectively. Hence, the node 107 selects the path passing through the node 104 because of the shortest distance. Next, the node 104 may select one of paths passing through the node 103, node 105, and node 101. The distances from the node 104 to the node 103, node 105, and node 101 are 2, 7, and 6, respectively. Hence, the node 104 selects the path passing through the node 103 because of the shortest distance. Next, the node 103 may select the path passing through the node 101. Therefore, the node 107 set the path passing through the node 104, node 103 and node 101 as the routing path to the destination node 100. In the same manner, other lowest-level nodes 108 to 112 can set their routing paths to the destination node 100, as illustrated in FIG. 1C.

Sensor nodes are capable of sending data to their desired destinations using established routing paths. However, while data is transmitted to the destination, the data may be attacked by a malicious adversary. To avoid a malicious attack, data is encrypted and then transmitted. For example, the Secure Network Encryption Protocol (SNEP) uses symmetric public-key cryptography to ensure data confidentiality, integrity, and authenticity. In the SNEP, a source node sending data encrypts the data using an encryption key ($K_{enc}$) derived from a master key and a counter value, appends a Message Authentication Code (MAC) generated using an MAC key ($K_{mac}$) to the encrypted data, and sends the encrypted data and the MAC together to a destination node.

FIG. 2 illustrates an example of a frame format.

In a majority of cases, data is transmitted between nodes in units of frames having a format illustrated in FIG. 2. A frame includes a frame header 210 and frame payload 220. The frame header 210 includes transmission control information such as frame control data, a source address and destination address. The frame payload 220 includes encrypted data and Media Access Control (MAC) data. In the use of the SNEP for encryption, the frame payload 220 containing user data is encrypted. However, the frame header 210 is mostly not encrypted because it is used for routing. If the frame header 210 is encrypted, the frame may be not routed to a desired destination. With exploitation of unencrypted header parts, a malicious adversary can easily attack the sensor network, causing various problems. There are two representative types of attacks. The first attack is related to packet sniffing with intent to send numerous abnormal packets to a particular node. In other words, an adversary can eavesdrop on packets of a normal node by packet capturing or sniffing, modify the Media Access Control data in the packets, and send the modified packets to a target node such as a sink node. The second attack is related to a relay attack. For example, an adversary can intercept a normal packet from a valid node, replace the source address of the packet with an adversary's address, and send the packet to a sink node. The sink node may be unaware of the source address modification and respond to the packet as usual, resulting in communication with the adversary.

As described above, a sensor network may be easily attacked by a malicious adversary because of unencrypted header parts. Hence, it is necessary to develop a technique to determine whether a sensor network is being attacked by an adversary, i.e., to check the normality of a sensor network.

SUMMARY OF THE INVENTION

The present invention has been made in view of at least some of the above problems, and the present invention provides a method and system for detecting a suspicious frame in a wireless sensor network.

In accordance with an exemplary embodiment of the present invention, there is provided a suspicious frame detection method for a wireless sensor network having a plurality of hierarchically structured sensor nodes, including: receiving information regarding a source node and higher-level nodes thereof constituting a routing path; computing a first probability of occurrence of the routing path with respect to training frames, and computing a second probability of occurrence of a path passing through the higher-level nodes and leading to the source node (source routing path) using the first probability; comparing the second probability of occurrence of the source routing path with a reference value; displaying, when the second probability is less than or equal to the reference value, an indication notifying abnormality of the source node. Information on routing paths formed by the sensor nodes using the training frames is pre-stored in a memory unit. The first probability and second probability are typically computed using an inference such as a Bayesian inference. When the source node is determined to be suspicious, a mark distinguishing the source node from other nodes or a message notifying abnormality of the source node is displayed.

In accordance with another exemplary embodiment of the present invention, there is provided a suspicious frame detection apparatus for a wireless sensor network having a plurality of hierarchically structured sensor nodes, typically including: a memory unit storing information on routing paths formed by the sensor nodes using training frames; a control unit receiving information regarding a source node and higher-level nodes thereof constituting a routing path, computing a first probability of occurrence of the routing path with respect to the training frames, computing a second probability of occurrence of a path passing through the higher-level nodes and leading to the source node (source routing path) using the first probability, comparing the second probability of occurrence of the source routing path with a reference value, and determining that the source node is a suspicious node when the second probability is less than or equal to the reference value; and a display unit displaying an indication notifying abnormality of the source node when the source node is determined to be a suspicious node.

In accordance with another exemplary embodiment of the present invention, there is provided a suspicious frame detection method for a wireless sensor network having a plurality of hierarchically structured sensor nodes, including: receiving sensing data from a sensor node, and data regarding an upper-level node of the sensor node and a cluster head node; creating a frame containing information on sensor nodes using the received data; extracting information regarding a source node and higher-level nodes thereof constituting a routing path; and transmitting the extracted information to a terminal device.

In accordance with yet another exemplary embodiment of the present invention, there is provided a wireless sensor network capable of suspicious frame detection, including: a plurality of hierarchically structured sensor nodes, each sensing temperature, illumination or humidity, and sending the sensed data and data regarding an upper-level node of the sensor node and a cluster head node; a data collecting node receiving data from the sensor nodes, and sending information, extracted from the data received from the sensor nodes, regarding a source node and higher-level nodes thereof constituting a routing path; and a terminal device receiving the information regarding a source node and higher-level nodes thereof from the data collecting node, computing a first probability of occurrence of the routing path with respect to training frames, computing a second probability of occurrence of a path passing through the higher-level nodes and leading to the source node (source routing path) using the first probability, comparing the second probability of occurrence of the source routing path with a reference value, and displaying an indication notifying abnormality of the source node when the second probability is less than or equal to the reference value.

Hereinabove, the features and advantages of the present invention are described in an exemplary perspective to help those skilled in the art in understanding the present invention. Other features and advantages constituting the subject matter of the present invention will become more apparent from the following detailed description.

In an exemplary feature of the present invention, information on routing paths for sensor nodes is collected and visualized to display the network topology using a proposed algorithm, and vulnerability of a sensor network due to the unencrypted Media Access Control header can be remedied. The user can view the topological state of the network through proposed software and check the abnormality of the network, thereby enhancing user convenience. Context awareness is provided to the overall sensor network, and an attack to the sensor network can be rapidly addressed.

BRIEF DESCRIPTION OF THE DRAWINGS

The above features and advantages of the present invention will be more apparent from the following detailed description in conjunction with the accompanying drawings, in which:

FIG. 6 illustrates an exemplary frame format in accordance with the principles of the present invention;

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted when their inclusion would obscure appreciation of the subject matter of the present invention by a person of ordinary skill in the art.

Figure 1A:
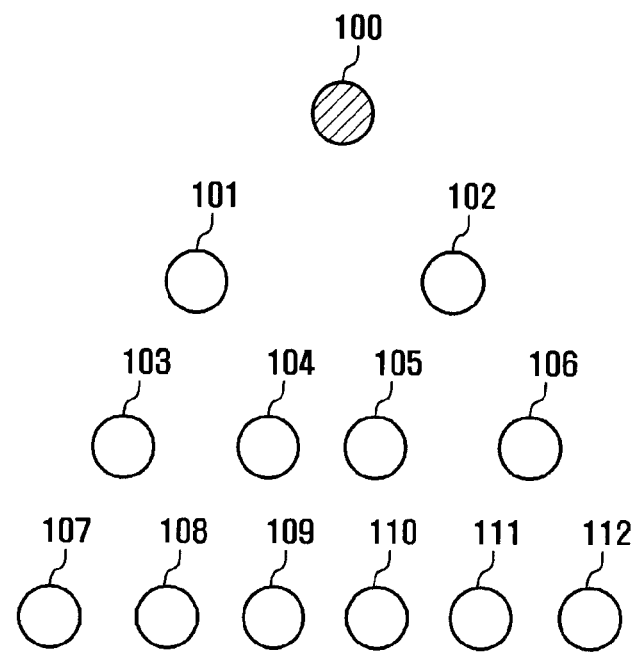
FIGS. 1A to 1C illustrate a routing process using a conventional AODV protocol.
Figure 1B:
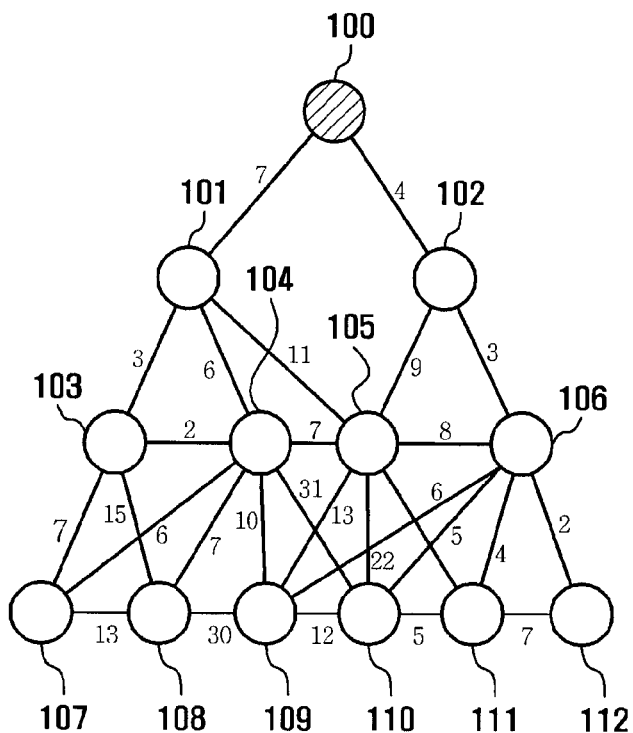
Figure 1C:
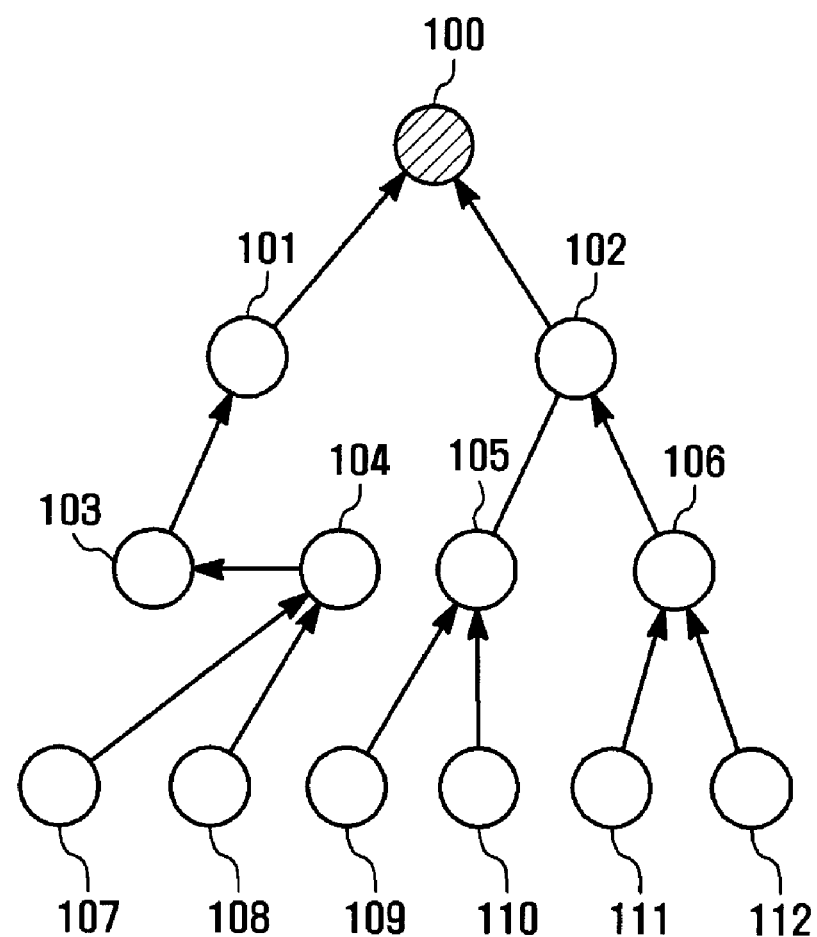
Figure 2:
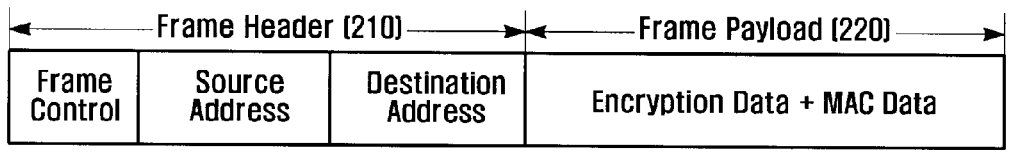
FIG. 2 illustrates a conventional frame format.
Figure 3:
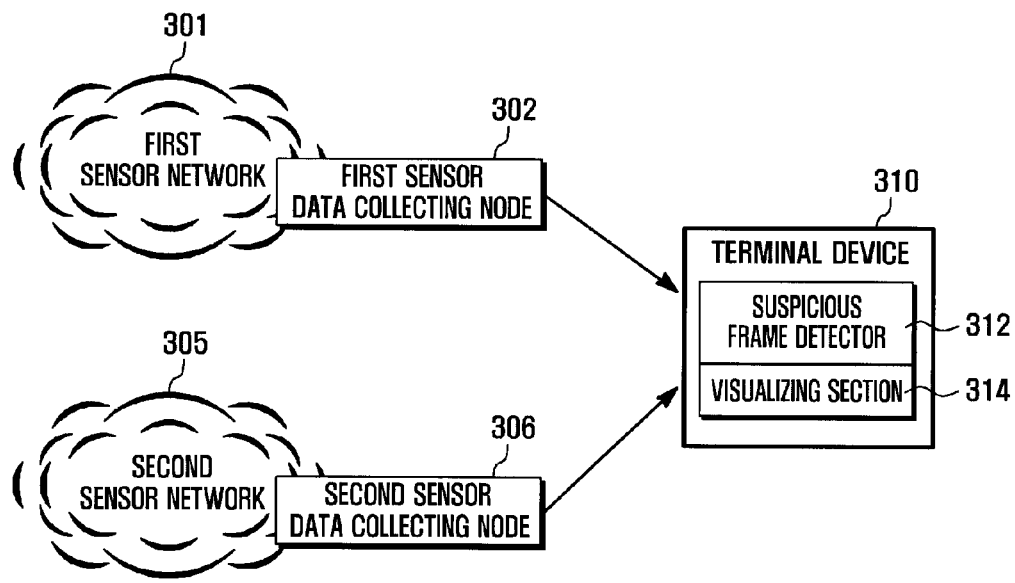
FIG. 3 is a block diagram illustrating a sensor network according to an exemplary embodiment of the present invention.

FIG. 3 is a block diagram illustrating a sensor network according to an exemplary embodiment of the present invention.

Referring to FIG. 3, the sensor network of the present invention typically includes a first sensor network 301 having a sink node and many sensor nodes, and a first sensor data collecting node 302 that is connected to the sink node of the first sensor network 301 and collects information from the sensor nodes. The sensor network may further include a second sensor network 305 having a sink node and many sensor nodes, and a second sensor data collecting node 306 that is connected to the sink node of the second sensor network 305 and collects information from the sensor nodes. A sensor data collecting node, like the first or second sensor data collecting node 302 or 306, present at each sensor network collects data from the sensor network, and has a sensor data collecting application. A sink node having the sensor data collecting application may comprise a sensor data collecting node. The first and second sensor data collecting nodes 302 and 306 read packets from the corresponding sink nodes using the sensor data collecting application, and create frames in a preset format. These frames each include fields storing values needed in computation for suspicious or abnormal frame detection. The needed values are the identifier of a source sensor node sending data, and identifiers of two higher-level sensor nodes of the source sensor node on the data transfer path to a destination sensor node. The first and second sensor data collecting node 302 and 306 extract identifiers of three sensor nodes, and sends the extracted identifiers to a terminal device 310 having a normality checking application. Upon reception of the node identifiers, the terminal device 310 performs computation to check frame normality through a suspicious frame detector 312, and informs, if a suspicious frame is detected, the user of suspicious frame detection through a visualizing section 314. Hence, the user can easily identify a suspicious frame, which might be resulted from an attack by an adversary.

Figure 4:
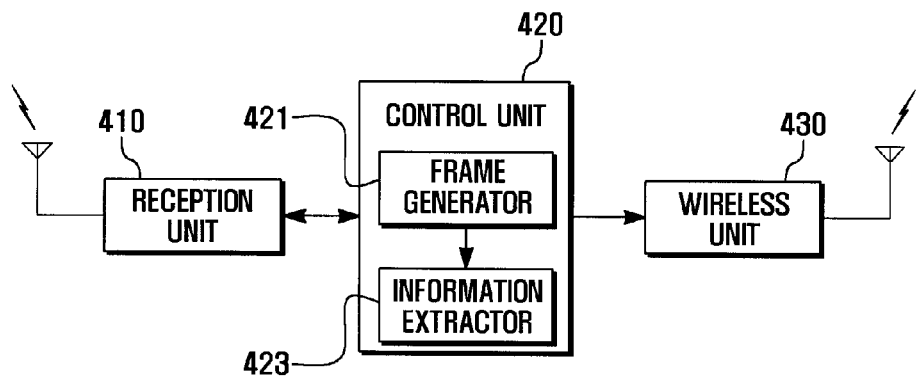
FIG. 4 is a block diagram illustrating a sensor data collecting node of the network in FIG. 3.

FIG. 4 is a block diagram illustrating a sensor data collecting node 302 or 306 of the network in FIG. 3.

Referring to FIG. 4, the sensor data collecting node includes a reception unit 410, control unit 420, and wireless unit 430. In the following description, the terminal device 310 of FIG. 3 is assumed to be a mobile device. However, the terminal device 310 may also be connected to the sensor data collecting node 302 or 306 through wired communication. If wired communication is utilized, the presence of wireless unit 430 of the sensor data collecting node and a wireless unit 510 of the terminal device in FIG. 5 may be unnecessary. Sensor nodes of a sensor network send sensed data on temperature, illumination and humidity, and node data to particular nodes, such as sensor data collecting nodes. The reception unit 410 of the sensor data collecting node may use short-range wireless communication such as the ZigBee technique to receive data from the sensor nodes. Here, received data may be hexadecimal data, as illustrated in Table 1.

TABLE 1

7E 42 7D 5E 00 0A 7D 5D 1A 01 00 1A 27 01 00 A4 01 A4 01 A4 01
A4 01 A4 01 A4 01 A4 01 A4 01 A4 01 A4 01 1A BA 7E
.
.
.
7E 42 7D 5E 00 0A 7D 5D 1A 01 00 D2 28 01 00 A4 01 A4 01 A4 01
A4 01 A4 01 A4 01 A4 01 A4 01 A4 01 A4 01 BF 12 7E

The control unit 420 controls the overall operation of the sensor data collecting node. In particular, the control unit 420 controls a frame generator 421 to create a frame in the format shown in FIG. 6 using hexadecimal data illustrated in Table 1.

FIG. 6 illustrates an example of a frame format in accordance with the principles of the present invention. This particular frame format is present for illustrative purposes only, and the claimed invention is not limited to the example describe and shown in FIG. 6.

The frame format for the example of FIG. 6 is compliant with the Media Access Control (MAC) frame defined in the IEEE 802.15.4. The frame created by the sensor data collecting node may also be in a format other than that of FIG. 6. The frame generator 421 in FIG. 4 creates a frame in the format shown in FIG. 6 using hexadecimal data illustrated in Table 1. The created frame includes fields for frame control, sequence number, destination address, source address, IEEE destination address, and IEEE source address 610 according to the international standard, and further includes fields for parent address 620, and grandparent address 630. The frame shown in FIG. 6 may be created in the case when sensor nodes A, B and C are connected in a hierarchy A-B-C and the sensor node C sends data to the sensor node A. Here, the IEEE source address 610 indicates the identifier of the sensor node C sending data, the parent address 620 indicates the identifier of the node B being a higher-level node of the sensor node C on the data transfer path toward a destination, and the grandparent address 630 indicates the identifier of the sensor node A being a higher-level node of the sensor node B. The information extractor 423 extracts field values for the IEEE source address 610, parent address 620 and grandparent address 630, and packetizes the extracted field values for transmission. These addresses of three sensor nodes are used to perform suspicious frame detection, and to notify the user of the abnormality of a sensor network, which is described later.

The wireless unit 430 sends a packet containing data extracted by the information extractor 423 to the terminal device 310 (FIG. 3) through a wireless Internet network or wireless local area network. In the description, the wireless unit 430 broadcasts a packet at regular intervals, and the terminal device 310 receives the broadcast packet if necessary. However, a packet may also be transmitted to the terminal device 310 immediately after creation. The wireless unit 430 may include a modulator/demodulator (modem) and a coder/decoder (codec) to modulate and encode a packet to be transmitted, or the control unit 420 may include a modem and codec. The wireless unit 430 upconverts the frequency of a signal to be transmitted to the extent of a frequency range usable in the local area communication or wireless Internet communication and amplifies the signal. The wireless unit 430 is unnecessary (or at least optional) when the terminal device 310 connects to the sensor data collecting nodes 302 and 306 through wired communication. In the description, it is assumed that the terminal device 310 communicates with the sensor data collecting nodes 302 and 306 through a radio frequency (RF) connection.

Figure 5:
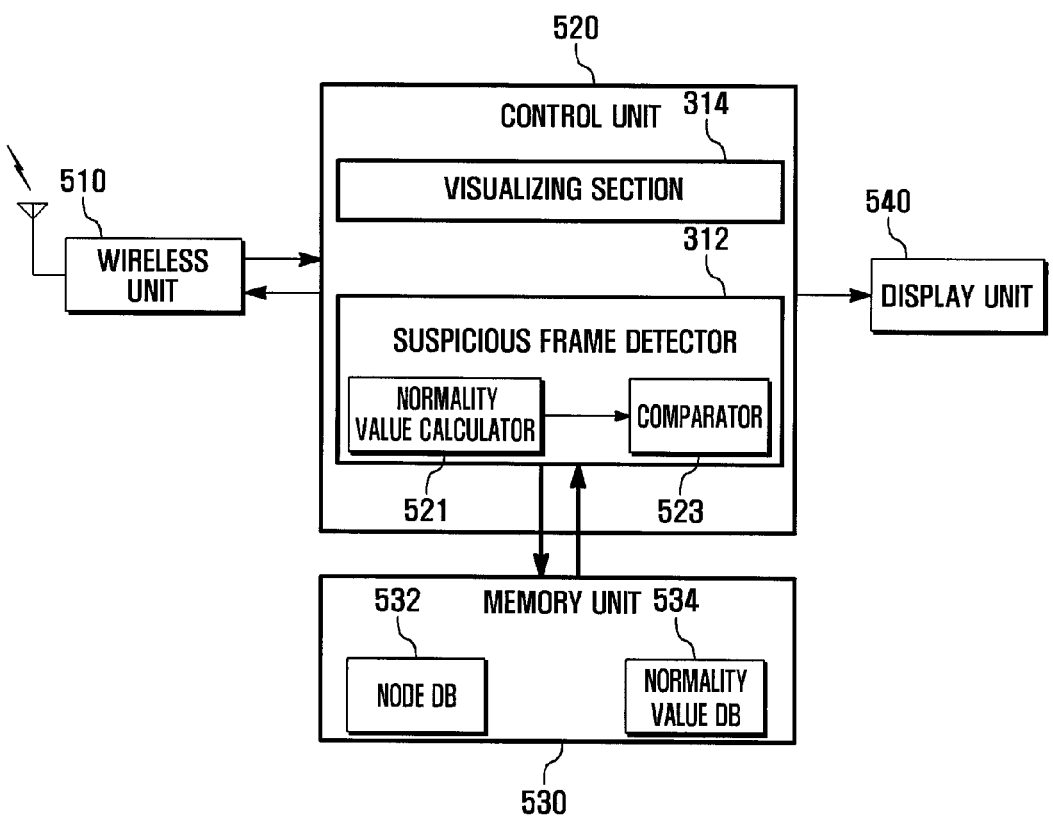
FIG. 5 is a block diagram illustrating a terminal device of the network in FIG. 3.

FIG. 5 is a block diagram illustrating the terminal device 310.

Referring to FIG. 5, the terminal device 310 includes a wireless unit 510, control unit 520, memory unit 530, and display unit 540 to detect a suspicious frame and notify detected abnormality. The wireless unit 510 performs wireless communication to receive packets broadcast by the sensor data collecting nodes 302 and 306 (FIG. 3). The wireless unit 510 may include a receiver to low-noise amplify a received data signal and downconvert the frequency of the received data signal. The wireless unit 510 is unnecessary when the terminal device 310 connects, for example, to the sensor data collecting nodes 302 and 306 through wired communication.

The control unit 520 controls the overall operation of the terminal device 310. The control unit 520 may include a modem and codec to demodulate and decode a received packet. In particular, the control unit 520 may include the suspicious frame detector 312 (such as shown in FIG. 3) to detect a suspicious frame, and a visualizing section 314 (such as also shown in FIG. 3) to visualize topology information of the sensor network. The suspicious frame detector 312 typically includes a normality value calculator 521 to compute a normality value indicating the normality of a routing path using received packet data through Bayesian inference, and a comparator 523 to compare the computed normality value with a reference value for abnormality determination. Bayesian inference uses a numerical estimate of the degree of belief in a hypothesis before evidence has been observed and calculates a numerical estimate of the degree of belief in the hypothesis after evidence has been observed. In the present invention, a normality value is computed as a probability for a desired one of routing paths traveled by previous frames (training frames). The visualizing section 314 visualizes topology information such as links between sensor nodes of the sensor network on the display unit 540.

Still referring to FIG. 5, the memory unit 530 may include a program memory section and data memory section. The program memory section stores programs to control regular operations of the terminal device 310. The data memory section stores data in use, and, in particular, further stores a node database (DB) 532 to maintain information regarding sensor nodes present on the sensor network, and a normality value DB 534 to maintain normality value tables and reference values. The display unit 540 displays various menus, applications and contents related to the operation of the terminal device 310, and provides screens to input and output various data. In particular, when a suspicious frame is detected, the display unit 540 notifies the corresponding node as an abnormal node.

Figure 7:
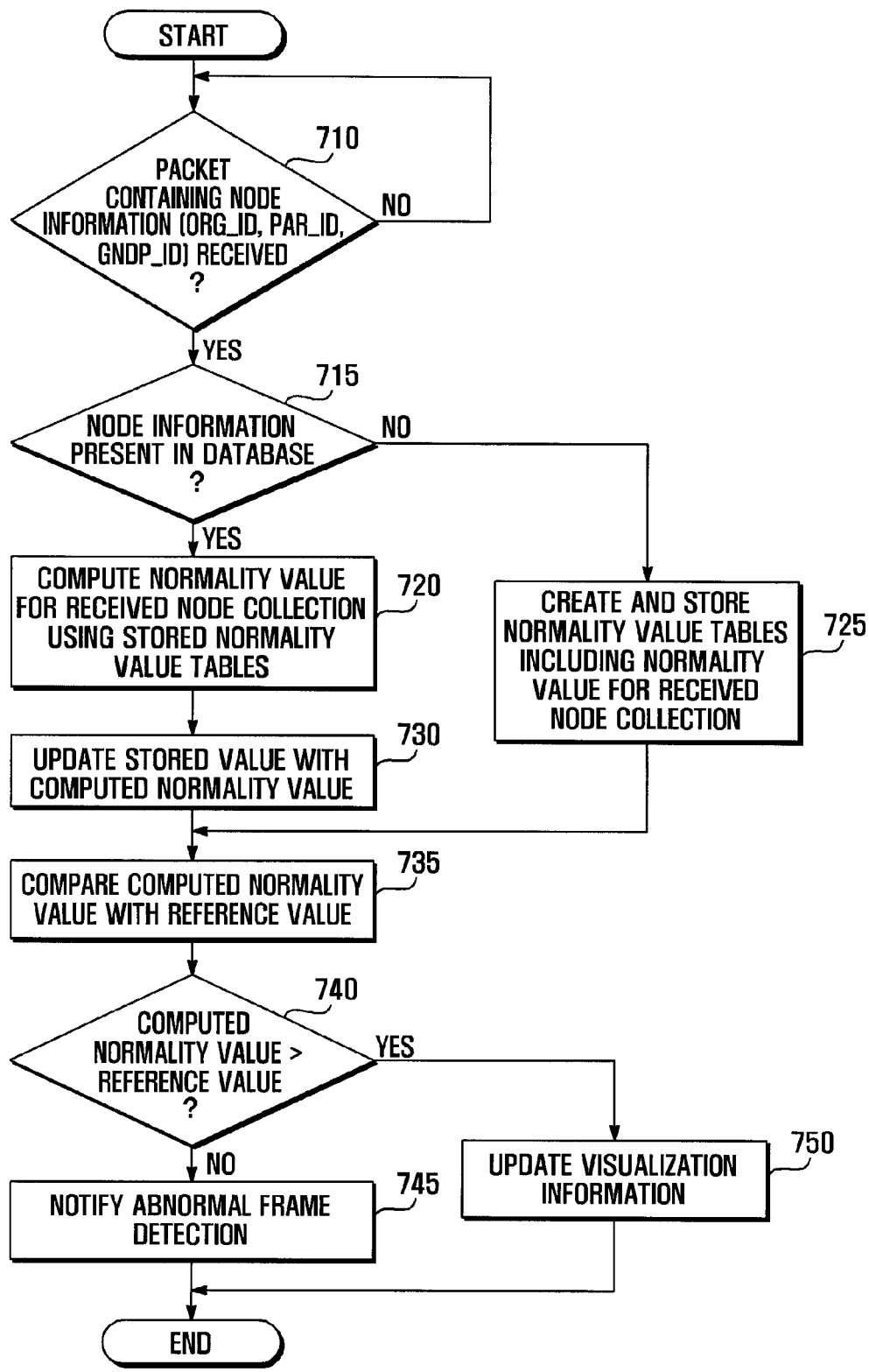
FIG. 7 is a flow chart illustrating an exemplary procedure to compute a normality value according to another exemplary embodiment of the present invention.

FIG. 7 is a flow chart illustrating an example of a procedure to compute a normality value according to another exemplary embodiment of the present invention.

Referring to FIG. 7, the control unit 520 of the terminal device 310 checks whether a packet containing node information is received (S710). A packet containing node information can be obtained, if necessary, by connecting to the sensor data collecting node 302 or 306 and receiving a broadcast packet. The node information includes field values used for computing a normality value, such as an identifier of a source node (ORG_ID), identifier of a parent node (PAR_ID) of the source node, and identifier of a grandparent node (GNDP_ID) of the source node. These three nodes (source node, parent node and grandparent node) are a basis node collection for normality value computation. If a packet containing node information is received, the control unit 520 proceeds to step S715. Under the control of the control unit 520, the normality value calculator 521 checks whether a routing path passing through the nodes in the received node collection is present in the node DB 532 (S715). In an example of suspicious frame detection, the normality checking application is designed to collect data transfer paths between sensor nodes on the sensor network for a preset time duration and to store the collected data transfer paths in the node DB 532 as training data. Here, the node DB 532 can manage information on sensor nodes present in the sensor network, and training data. Entries in the node DB 532 can be added, deleted or updated according to changes in sensor nodes, and the number of routing paths is updated at each occurrence of an event. If a routing path associated with the received node collection is present in the node DB 532, the control unit 520 proceeds to step S720, or otherwise proceeds to step S725. Under the control of the control unit 520, the normality value calculator 521 computes the normality value of the routing path associated with the received node collection through Bayesian inference using stored normality value tables (S720). Normality value tables are described later. Normality value computation is described using a sensor network illustrated in FIG. 8.

Figure 8:
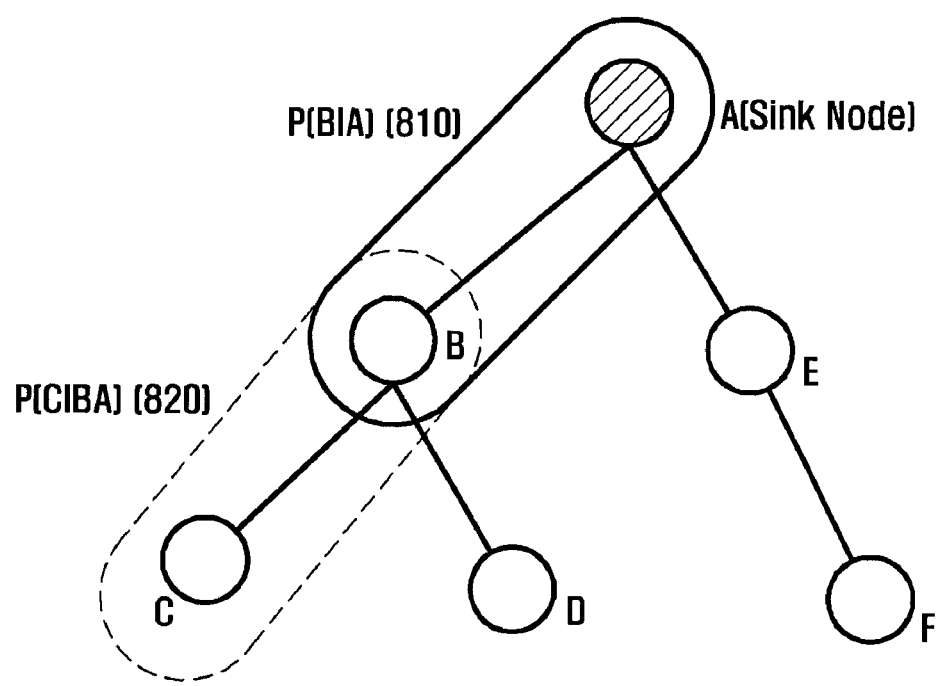
FIG. 8 illustrates an example of normality-value computation over a sensor network.

FIG. 8 illustrates an example of normality-value computation over a sensor network.

The hierarchical sensor network of FIG. 8 includes a sensor node 'A' as the sink node, and sensor nodes 'B' to 'F'. Information on the sensor nodes is stored in the node DB 532. For normality-value computation, the node DB 532 is assumed to pre-store the information on sensor nodes and training data. In this exemplary sensor network, routing paths toward the sink node 'A' includes a first path from the sensor node 'C' via the sensor node 'B' to the sensor node 'A', a second path from the sensor node 'D' via the sensor node 'B' to the sensor node 'A', and a third path from the sensor node 'F' via the sensor node 'E' to the sensor node 'A'. The first path has an "ORG_ID" value of 'C', "PAR_ID" value of 'B' and "GND-P_ID" value of 'A' as routing information. The second path has an "ORG_ID" value of 'D', "PAR_ID" value of 'B' and "GNDP_ID" value of 'A' as routing information. The third path has an "ORG_ID" value of 'F', "PAR_ID" value of 'E' and "GNDP_ID" value of 'A' as routing information. The first to third paths correspond respectively to connections of A-B-C, A-B-D and A-E-F, in which case these connections are represented by "ABC", "ABD" and "AEF", respectively, for the purpose of description.

To determine the abnormality of a received frame, for a node collection (a source node "ORG_ID" sending the frame, parent node "PAR_ID" of the source node, and grandparent node "GNDP_ID" of the source node), the probability that a routing path associated with the node collection had been taken by the training data frames is calculated, and then the probability of occurrence of the source node with given higher-level nodes (parent node and grandparent node) is calculated. For example, in FIG. 8, when higher level nodes 810 (sensor nodes 'A' and 'B') of the source node 'C' belong to a single node collection, the probability that a routing path associated with the node collection ABC had been taken by the training data frames is calculated, and the probability of occurrence of the source node 'C' with given higher-level nodes "AB" is calculated. Hence, it is possible to determine whether a routing path had been frequently used by the training data frames, and whether a path from a particular source node with given higher-level nodes had been frequently used by the training data frames or whether a particular source node with given higher-level nodes sends data more frequently than before at an abnormal rate.

In FIG. 8, routing paths are "ABC", "ABD" and "AEF", and node collections are "ABC", "ABD" and "AEF". For the purpose of description, a routing path passing through all nodes in a node collection is referred to as a node collection routing path; a path passing through highest-level nodes in a node collection is referred to as an upper-level routing path (for example, for a node collection "ABC", the upper-level routing path indicates a path from the highest-level node 'A' to the next highest-level node 'B'); and a path passing through highest-level nodes in a node collection and leading to the source node is referred to as a source routing path (for example, for a node collection "ABC", the source routing path indicates a path passing through the sensor nodes 'A' and 'B' and leading to the source node 'C'). In normality value computation to detect an abnormal frame, for a particular node collection, the probability P of occurrence of the node collection routing path is computed using Equation 1, and the probability R of occurrence of the source routing path is computed using Equation 2. Equation 2 may be transformed into Equation 3 for easy use in software.

$$C(D, L) = \sum_{k=k^0}^{L} \frac{k^0 \alpha + N}{K\alpha + N} P(k|D) \quad \text{[Equation 1]}$$

$$P(X^{N+1} = i|D) = \frac{\alpha + N_i}{K^0 + N} C(D, L) \quad \text{[Equation 2]}$$

$$P(X = i|D) = \frac{C(N_i + \alpha)}{K\alpha + N}, C = \frac{N}{N + L - K} \quad \text{[Equation 3]}$$

In these equations, C denotes the probability of occurrence of the routing path with respect to the training data frames, k is an integer, D is the total number of node collections, X is the node collection to be observed, N is the frequency of the upper-level routing path, $N_i$ is the frequency of the source routing path, K is the number of nodes reachable from the upper-level nodes in the training data frames, L is the number of nodes present in the network (i.e., the number of nodes appearing on routing paths during the training session), and a is a user-defined value for setting a reference value.

Figures 10A, 10B:
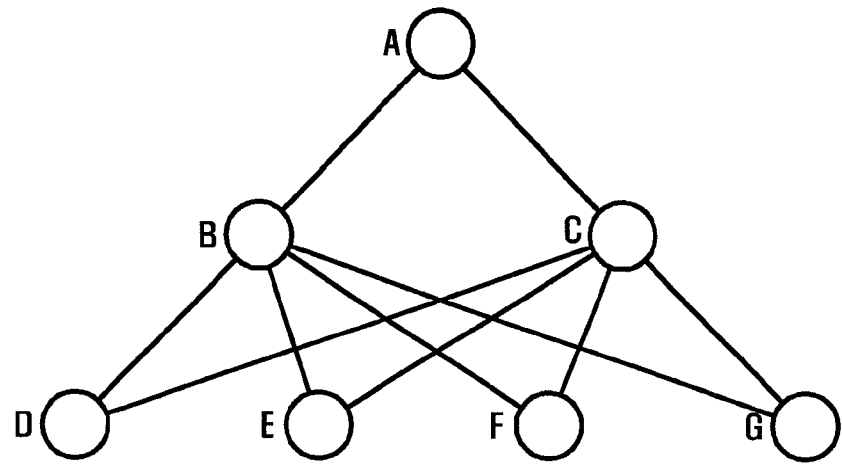
FIG. 10A illustrates a sensor network for normality-value computation.
FIG. 10B illustrates routing paths of packets to be used in normality-value computation.

These parameters are explained in connection with FIGS. 10A and 10B. FIG. 10A illustrates an example of sensor network for normality-value computation, and FIG. 10B illustrates examples of routing paths of packets to be used in normality-value computation.

In the sensor network of FIG. 10A, sensor nodes 'A' to 'G' are present, and the sensor node 'A' is the sink node. It is assumed that all the sensor nodes 'A' to 'G' have appeared in routing paths for transmission of the training data frames. Received packets and their transmission paths are listed in FIG. 10B. For example, the first packet traveled along a path from the sensor node 'D' via the sensor node 'B' to the sensor node 'A'. The parameters for the eighth packet are computed as follows.

For the eighth packet, the routing path is "ABD", and thus the node collection to be observed (X) is "ABD". The upper-level nodes are "AB" and appear six times out of total 8 transmissions, and thus the frequency of the upper-level routing path (N) is 6. The frequency of the source routing path ($N_i$) is 3. The nodes reachable from the upper-level nodes are four sensor nodes 'D' to 'G', and hence K is 4. The nodes appearing on routing paths are seven sensor nodes 'A' to 'G', and hence L is 7. In this case, if those routing paths listed in FIG. 10B are actually used in the training session, node collections "ABD", "ABEF", "ABFF", "ABG", "ACF" and "ACG" can be stored in the node DB 532 as possible models. Besides the nodes actually appearing in routing paths, if other sensor nodes 'H', 'I' and 'J' were present, the number of nodes present in the sensor network (D) would be 10.

Referring back to FIG. 8, computation of a normality value using Equations 1 to 3 is described.

For normality value computation, the normality value calculator 521 typically divides the nodes into node collections of three nodes. That is, for example, a source node and two higher-level nodes form a single node collection. For each node collection, the normality value calculator 521 calculates the probability of occurrence of the routing path with respect to the training data frames using Equation 1. Next, the normality value calculator 521 calculates the probability of occurrence of the source routing path using Equation 2 and the calculated probability of the node collection routing path. Then, the normality value calculator 521 creates normality value tables containing values computed using Equations 1 and 2, and stores the created normality value tables in the normality value DB 534. Tables 2 to 4 are some examples of normality value tables generated in relation to the sensor network of FIG. 8.

Node collection information (ORG_ID, PAR_ID and GNDP_ID) contained in received packets may be stored in the node DB 532 in a form illustrated in Table 2. Each node collection of three nodes is divided into sequences of two nodes. In FIG. 8, reference symbols 810 and 820 indicate 2 two-node sequences. Two higher-level nodes of a node collection correspond to an upper-level routing path, and the path from the higher-level nodes to the source node corresponds to a source routing path. This division using two-node sequences is referred to as a bi-gram approach. Table 3 illustrates two-node sequences produced using the bi-gram approach.

TABLE 2

| Frame 1 | A-B-C |
| Frame 2 | A-E-F |
| Frame 3 | A-B-D |
| Frame 4 | A-B-C |
| ... | ... |

TABLE 3

| A-B |
| B-C |
| A-E |
| E-F |
| A-B |
| B-D |
| A-B |
| B-C |
| ... |

TABLE 4

| X | (A, B, C) | X | (A, E, F) | ... |
|---|---|---|---|---|
| N | 3 | N | 1 | |
| $N_i$ | 2 | $N_i$ | 1 | |
| K | 5 | K | 5 | |
| L | 6 | L | 6 | |
| α | 100 | α | 100 | |
| P | 0.300 | P | 0.108 | |

The normality value calculator 521 computes normality values using routing paths in Table 3, and Equations 1 and 2. Computation of normality values is performed through Bayesian inference using historical events. To achieve this, training data is created and stored. For each node collection, under the control of the control unit 520, the normality value calculator 521 calculates the probability of occurrence of the routing path with respect to the training data, and stores the calculated probability in a table like Table 4. Table 4 illustrates normality values of node collections "ABC" and "AEF". The normality value P of the node collection "ABC" computed using Equations 1 and 2 is 0.300, under conditions that the node collection to be observed (X) is "ABC", the frequency of the upper-level routing path (N) is 3, the frequency of the source routing path ($N_i$) is 2, the number of nodes reachable from the upper-level nodes in the training data (K) is 5, the number of nodes appearing on routing paths during the training session (L) is 6, and α is 100. In addition, the normality value P of the node collection "AEF" computed using Equations 1 and 2 is 0.108, under conditions that the node collection to be observed (X) is "AEF", the frequency of the upper-level routing path (N) is 1, the frequency of the source routing path ($N_i$) is 1, the number of nodes reachable from the upper-level nodes in the training data (K) is 5, the number of nodes appearing on routing paths during the training session (L) is 6, and α is 100.

Figure 9A:
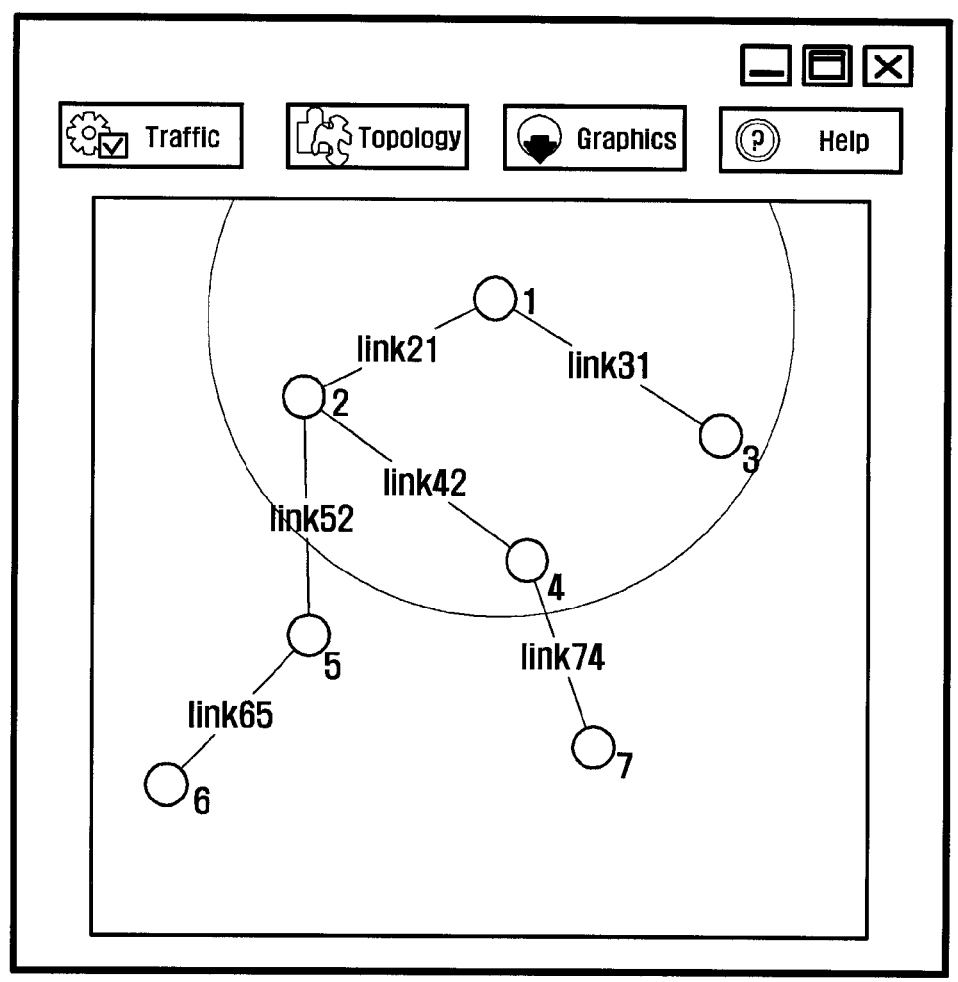
FIG. 9A illustrates display of normal topology information.
Figure 9B:
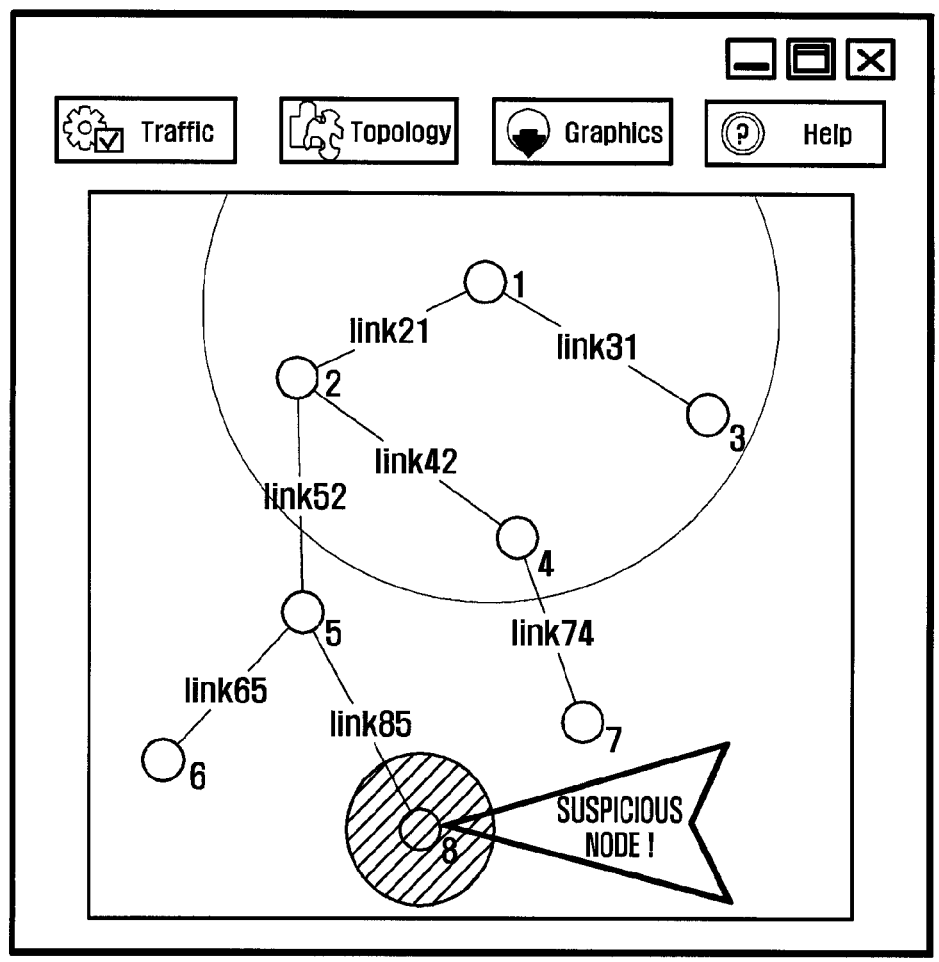
FIG. 9B illustrates display of topology information including a suspicious node indicator.

Referring now back to FIG. 7, after computation of the normality value P using the normality value tables, under the control of the control unit 520, the normality value calculator 521 updates the normality value DB 534 with normality value table values (S730). On the other hand, under the control of the control unit 520, the normality value calculator 521 creates normality value tables like Tables 2 to 4 including a normality value for the received node collection, stores the normality value table values in the normality value DB 534 (S725), and proceeds to step S735. Under the control of the control unit 520, the comparator 523 compares the computed normality value P with the reference value (S735). The reference value is a value preset by the application designer for suspicious node determination. If the computed normality value P is less than or equal to the reference value, the comparator 523 proceeds to step S745 to handle a suspicious path, or otherwise proceeds to step S750 to handle a normal path (S740). For example, when the reference value is set to 0.2, the node collection "ABC" in Table 4 has a normality value of 0.300, which is greater than the reference value of 0.2. The comparator 523 determines that the routing path "ABC" is in a normal state, and frames traveled along the routing path "ABC" are normal frames that are not attacked by an adversary. However, the node collection "AEF" in Table 4 has a normality value of 0.108, which is less than the reference value of 0.2. Because the routing path "AEF" is an infrequently used path at ordinary times, the comparator 523 determines that an abnormal frame is detected. Although, in the above description, a frame traveled along a routing path having a normality value less than or equal to a reference value is determined to be an abnormal frame, a frame traveled along a routing path having a normality value out of a reference range may be determined to be an abnormal frame. Hence, the criteria for abnormal frame determination may be changed. If an abnormal frame is detected, the visualizing section 314 displays, under the control of the control unit 520, information indicating a source node sending the frame along the abnormal path as a suspicious node through the display unit 540 (S745). FIG. 9B illustrates display of a suspicious node. If no abnormal frame is detected, the visualizing section 314 visualizes information on sensor nodes through the display unit 540 under the control of the control unit 520 (S750). FIG. 9A illustrates visualization of sensor nodes.

FIG. 9A illustrates an exemplary display of normal topology information, and FIG. 9B illustrates display of topology information including a suspicious node indicator. The topology of a sensor network denotes the configuration of connections between sensors.

The suspicious frame detector 312 (FIG. 5) detects an abnormal frame by computing normality values of nodes on the sensor network. If no abnormal frame is detected, the visualizing section 314 visualizes information on sensor nodes, for example links between nodes, as in FIG. 9A. The topology of a network having seven sensor nodes and links therebetween is shown in FIG. 9A. If an abnormal frame is detected through computation of normality values, the visualizing section 314 displays information indicating a source node sending the frame as a suspicious node on the display unit 540, as illustrated in FIG. 9B. A sensor node '8' is determined to be a suspicious node in FIG. 9B. A sensor node that is determined to be suspicious is marked using at least one of a hatched area, warning message, and distinct color.

As described above, the normality value computation algorithm of the present invention detects a suspicious or abnormal frame, and displays, if an abnormal frame is detected, an indicator indicating a suspicious sensor node sending the detected abnormal frame. Thereby, the user can readily identify a suspicious sensor node during transmission of frames in an environment vulnerable to attacks owing to unencrypted header parts of the frames.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims. For example, while the suspicious node is identified on a display, there could alternatively or additional be an audible warning, and another entity could receive the alert (such as an additional wireless device that has been designated to receive such indications).

What is claimed is:

1. A suspicious frame detection method for a wireless sensor network having a plurality of hierarchically structured sensor nodes, comprising:

receiving by wireless unit information regarding a source node and at least one upper-level node thereof constituting a routing path that is provided to a control unit;

computing by the control unit a first probability of occurrence of use of the routing path with respect to previous frames, and computing a second probability of occurrence of use of a source routing path passing through the at least one upper-level node and leading to said source node using the first probability;

comparing by the control unit the second probability of occurrence of use of the source routing path with a reference value; and notifying an abnormality of the source node, when the second probability is less than or equal to the reference value.

2. The suspicious frame detection method of claim 1, wherein the information regarding at least one upper-level node comprises at least one of an identifier (PAR_ID) of a parent node of the source node and an identifier (GNDP_ID) of a grandparent node of the source node being an upper-level node of the parent node; and wherein the notifying comprises displaying an indication notifying the abnormality.

3. The suspicious frame detection method of claim 2, wherein displaying an indication comprises displaying, when the source node is suspicious, at least one of a mark distinguishing the source node from other nodes and a message notifying abnormality of the source node.

4. The suspicious frame detection method of claim 2 wherein the indication comprises including an audible warning.

5. The suspicious frame detection method of claim 1, further comprising storing predetermined information on routing paths formed by the nodes using the previous frames in a memory unit.

6. The suspicious frame detection method of claim 1, wherein the first probability of occurrence of use of the routing path is computed using the following equation:

$$C(D, L) = \sum_{k=k^0}^{L} \frac{k^0 \alpha + N}{K \alpha + N} P(k \mid D)$$

where C denotes the probability of occurrence of the routing path with respect to the training frames, D is the total number of node collections, k is an integer, N is the frequency of an upper-level routing path, K is the number of nodes reachable from the at least one upper-level node with respect to the training frames, L is the number of nodes present in the network, and α is a user-defined value.

7. The suspicious frame detection method of claim 6, wherein the second probability R of occurrence of use of the source routing path is computed using the following equation:

$$R(X=i|D) = \frac{C(N_i + \alpha)}{K\alpha + N}, \left(C = \frac{N}{N+L-K}\right)$$

where C denotes the probability of occurrence of use of the routing path with respect to the training frames, D is the total number of node collections, X is a node collection to be observed, N is the frequency of an upper-level routing path, $N_i$ is the frequency of the source routing path, K is the number of nodes reachable from the at least one upper-level node with respect to the training frames, L is the number of nodes present in the network, and α is a user-defined value.

8. The suspicious frame detection method of claim 1, wherein the reference value comprises a preset value to determine an abnormality of a frame transfer path.

9. The suspicious frame detection method of claim 1, wherein the first probability and second probability are computed using Bayesian inference.

10. The suspicious frame detection method of claim 1, further comprising displaying the abnormality of the source node.

11. A suspicious frame detection apparatus for a wireless sensor network having a plurality of hierarchically structured sensor nodes, comprising:
   a memory unit for storing information on routing paths formed by the sensor nodes using previous frames;
   a control unit for receiving information regarding a source node and at least one upper-level node thereof constituting a routing path, for computing a first probability of occurrence of said routing path with respect to the previous frames, for computing a second probability of occurrence of a source routing path passing through the at least one upper-level node and leading to the source node using the first probability, for comparing the second probability of occurrence of the source routing path with a reference value, and for determining that the source node is a suspicious node when the second probability is less than or equal to the reference value, and for notifying of an abnormality of the source node when the source node is determined to be a suspicious node.

12. The suspicious frame detection apparatus of claim 11, wherein the information regarding at least one upper-level node comprises at least one of an identifier (PAR_ID) of a parent node of the source node and an identifier (GNDP_ID) of a grandparent node of the source node being an upper-level node of the parent node; and
   wherein the notification means includes a display unit for displaying an indication of the abnormality.

13. The suspicious frame detection apparatus of claim 12, wherein the display unit displays, one of a mark for distinguishing the source node from other nodes and a message for notifying the abnormality of the source node when the source node is a suspicious node.

14. The suspicious frame detection apparatus of claim 11, wherein the control unit computes the first probability of occurrence of the routing path using the following equation:

$$C(D, L) = \sum_{k=k^0}^{L} \frac{k^0 \alpha + N}{K\alpha + N} P(k|D)$$

where C denotes the probability of occurrence of the routing path with respect to the training frames, D is the total number of node collections, k is an integer, N is the frequency of an upper-level routing path, K is the number of nodes reachable from the at least one upper-level node with respect to the training frames, L is the number of nodes present in the network, and α is a user-defined value.

15. The suspicious frame detection apparatus of claim 14, wherein the control unit computes the second probability R of occurrence of the source routing path using the following equation:

$$R(X=i|D) = \frac{C(N_i + \alpha)}{K\alpha + N}, \left(C = \frac{N}{N+L-K}\right)$$

where C denotes the probability of occurrence of the routing path with respect to the training frames, D is the total number of node collections, X is a node collection to be observed, N is the frequency of an upper-level routing path, $N_i$ is the frequency of the source routing path, K is the number of nodes reachable from the at least one upper-level node with respect to the training frames, L is the number of nodes present in the network, and α is a user-defined value.

16. The suspicious frame detection apparatus of claim 11, wherein the memory unit includes storage of a table containing information necessary for computing the first probability and second probability.

17. The suspicious frame detection apparatus of claim 11, wherein the control unit computes the first probability and second probability using Bayesian inference.

18. The suspicious frame detection apparatus of claim 11, wherein the reference value is a preset value for determining an abnormality of a frame transfer path.

19. A wireless sensor network that detects suspicious frames, comprising:
   a plurality of hierarchically structured sensor nodes, each sensor node senses at least one of temperature, illumination or humidity, and sending the sensed data and data regarding an upper-level node of the sensor node and a cluster head node;
   a data collecting node that receives data from the sensor nodes, and sends information regarding a source node and at least one upper-level node thereof constituting a routing path, said information being extracted from the data received from the sensor nodes; and
   a terminal device that receives the information regarding a source node and upper-level nodes thereof from the data collecting node, computes a first probability of occurrence of the routing path with respect to previous frames, computes a second probability of occurrence of a source routing path passing through the at least one upper-level node and leading to the source node using the first probability, compares the second probability of occurrence of the source routing path with a reference value, and displays an indication notifying abnormality of the source node when the second probability is less than or equal to the reference value.

* * * * *